(12) United States Patent
Mantha et al.

(10) Patent No.: US 11,196,298 B2
(45) Date of Patent: Dec. 7, 2021

(54) WIRELESS CHARGING DEVICE WITH SINUSOIDAL PULSE-WIDTH MODULATION

(71) Applicant: Apple Inc., Cupertino, CA (US)

(72) Inventors: Soumya Mantha, San Jose, CA (US); Manjit S. Walia, San Jose, CA (US); Rahul A. Sabnani, Colma, CA (US)

(73) Assignee: Apple Inc., Cupertino, CA (US)

( * ) Notice: Subject to any disclaimer, the term of this patent is extended or adjusted under 35 U.S.C. 154(b) by 845 days.

(21) Appl. No.: 16/005,382

(22) Filed: Jun. 11, 2018

(65) Prior Publication Data

US 2019/0305596 A1    Oct. 3, 2019

Related U.S. Application Data

(60) Provisional application No. 62/649,486, filed on Mar. 28, 2018.

(51) Int. Cl.
  *H02J 50/12*   (2016.01)
  *H02M 7/5395*  (2006.01)
  *H02J 7/02*    (2016.01)

(52) U.S. Cl.
  CPC ............. *H02J 50/12* (2016.02); *H02J 7/025* (2013.01); *H02M 7/5395* (2013.01)

(58) Field of Classification Search
  CPC ......... H02J 50/12; H02J 7/025; H02M 7/5395
  USPC ....................................... 307/104
  See application file for complete search history.

(56) References Cited

U.S. PATENT DOCUMENTS

| | | | | |
|---|---|---|---|---|
| 8,482,158 B2 * | 7/2013 | Kurs | ....... | H02J 50/12 307/104 |
| 9,077,192 B2 | 7/2015 | Lisi et al. | | |
| 9,787,365 B2 * | 10/2017 | Lee | ....... | H02J 7/0047 |
| 9,843,219 B2 | 12/2017 | Ye et al. | | |
| 9,935,470 B2 | 4/2018 | Pagano et al. | | |
| 2010/0244576 A1 * | 9/2010 | Hillan | ....... | G06K 7/0008 307/104 |
| 2014/0183967 A1 * | 7/2014 | Ryu | ....... | H02J 50/40 307/104 |
| 2017/0302110 A1 | 10/2017 | Riehl et al. | | |

* cited by examiner

*Primary Examiner* — Alfonso Perez Borroto
(74) *Attorney, Agent, or Firm* — Treyz Law Group, P.C.; Jason Tsai

(57) ABSTRACT

A wireless power system has a wireless power transmitting device and a wireless power receiving device. The wireless power transmitting device may include an inverter configured to drive a resonant circuit and may further include a sinusoidal pulse-width modulation (PWM) signal generator configured to generate a corresponding sinusoidal PWM control signal. The inverter may have an input that receives the sinusoidal PWM control signal. The sinusoidal PWM control signal may exhibit a plurality of different pulse widths summing to the target duty cycle of the sinusoidal PWM control signal. Operated in this way, the wireless power transmitting device exhibits reduced harmonic distortions, which mitigates undesired radiated spurious emissions.

20 Claims, 13 Drawing Sheets

WIRELESS CHARGING DEVICE WITH SINUSOIDAL PULSE-WIDTH MODULATION

This application claims the benefit of provisional patent application No. 62/649,486, filed Mar. 28, 2018, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil in the portable electronic device receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device and a wireless power receiving device. The wireless power receiving device has a receive coil that receives wireless power signals from the wireless power transmitting device and has a rectifier that produces direct-current power from the received wireless power signals.

The wireless power transmitting device has wireless power transmitting circuitry that includes a resonant circuit, an inverter for driving the resonant circuit, and pulse-width modulation (PWM) signal generator that outputs a periodic control signal to the inverter at a selected duty cycle. The resonant circuit may include a wireless power transmitting coil and a capacitor coupled to the wireless power transmitting coil. The inverter may include a first switch, a second switch coupled in series with the first switch, and a capacitor that is coupled in parallel with the first switch and that is configured to filter out undesired high-frequency components.

The PWM signal generator may include a comparator having a first (negative) input that receives a first periodic signal, a second (positive) input that receives a second periodic signal, and an output at which the control signal is provided. The first periodic signal may have a first frequency, whereas the second periodic signal may have a second frequency that is greater than the first frequency (e.g., the second frequency may be at least 10 times the first frequency). The first periodic signal may be a sinusoidal waveform. The second periodic signal may be a periodic ramp signal such as a triangular waveform or a sawtooth waveform.

Configured in this way, the PWM signal generator may output a sinusoidal PWM control signal oscillating at a given power frequency, where the control signal has a plurality of different pulse widths in a period of the power frequency summing to the selected duty cycle of the control signal. The use of a sinusoidal PWM control signal with different pulse widths reduces harmonic distortion at the input of the inverter, which dramatically decreases radiated spurious emissions at the wireless power transmitting circuitry.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

Figure 1:
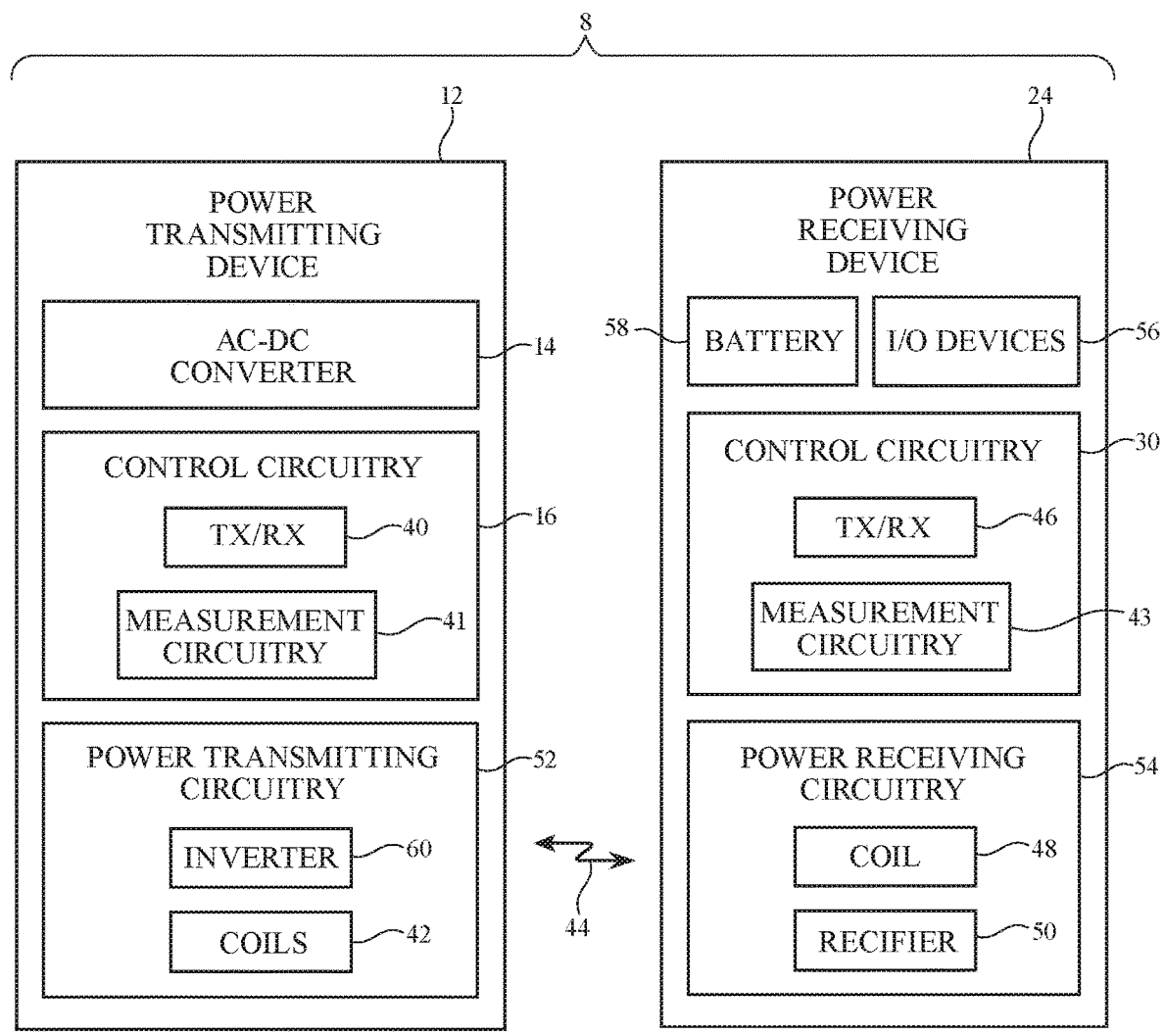
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat).

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 may be used in powering a battery such as battery 58 and may be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 may also use one or more coils 42 to transmit in-band signals at a given power frequency (or power transmission frequency) that are received by wireless transceiver circuitry 46 using coil 48. Similarly, wireless transceiver circuitry 46 may use one or more coils 48 to transmit in-band signals at the given power frequency that are received by wireless transceiver circuitry 40 using coil 42. Any suitable modulation scheme may be used to support in-band communications between device 12 and device 24.

In some cases, wireless transceiver circuitry 40 in power transmitting device 12 and wireless transceiver circuitry 46 in power receiving device 24 may communicate in-band by modulating the AC drive signals that are used to transfer power. Frequency shift keying (FSK), amplitude shift keying (ASK), or any other desired modulation of the AC drive signals may be used to convey in-band data between device 12 and device 24 while power is conveyed wirelessly from device 12 to device 24.

For example, during wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between devices 12 and 24 may also use ASK modulation and demodulation techniques. For example, wireless transceiver circuitry 46 may transmit in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

To increase the rate of data transmission and increase noise immunity of in-band communications, wireless transceiver circuitry 40 and wireless transceiver circuitry 46 may be configured to inject one or more data carrier waves (that have a higher frequency than the AC drive signals) to the AC drive signals used for wireless power transfer. The data carrier waves may be transmitted between devices 12 and 24 using coils 42 and 48. The data carrier waves may have a higher frequency than the AC drive signals to enable faster data transmission between devices 12 and 24. Power receiving device 24 can transmit data to power transmitting device 12 by modulating the data carrier waves.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
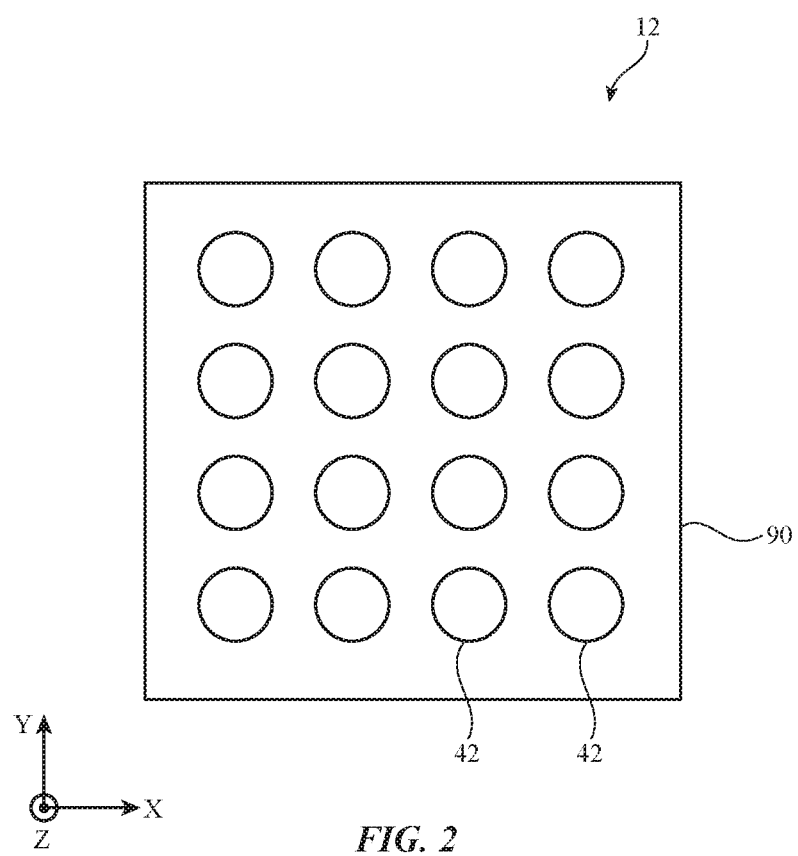
FIG. 2 is a top view of an illustrative wireless power transmitting device in accordance with an embodiment.

A top view of an illustrative configuration for device 12 in which device 12 has an array of coils 42 is shown in FIG. 2. In the example of FIG. 2, device 12 has an array of coils 36 that lie in the X-Y plane. Coils 36 of device 12 are covered by a planar dielectric structure such as a plastic member or other structure forming charging surface 90. The lateral dimensions (X and Y dimensions) of the array of coils 36 in device 12 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not partially overlap each other in one or more layers of coils. Coils 42 may be circular or may have other suitable shapes (e.g., coils 42 may be square, may have hexagonal shapes, may have other shapes having rotational symmetry, etc.).

Figure 3:
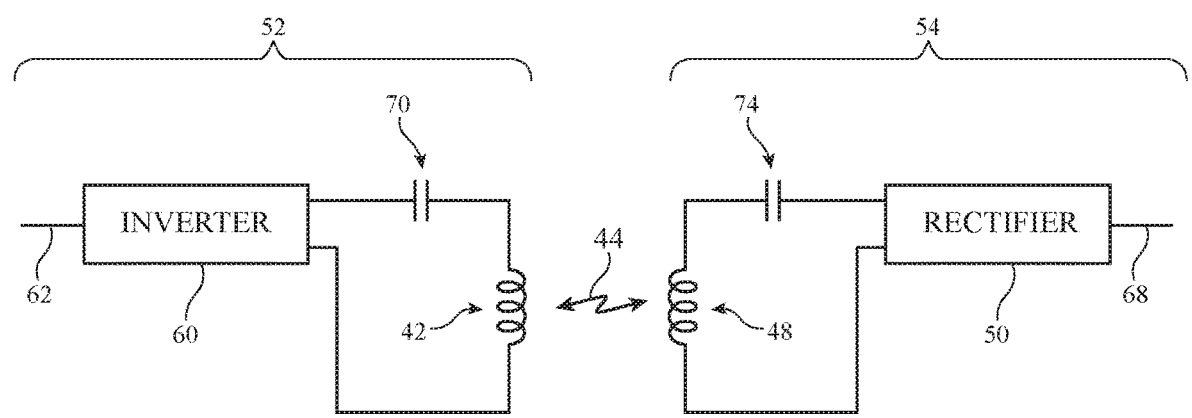
FIG. 3 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 3. As shown in FIG. 3, power transmitting circuitry 52 may include drive circuitry such as inverter 60 that supply drive signals at the wireless power transmission frequency to a wireless power transmitter resonant circuit. The wireless power transmitter resonant circuit may include a wireless power transmitting coil 42 and capacitor 70. Rectifier 50 in wireless power receiving circuitry 54 receives wireless power signals 44 using a wireless power receiver resonant circuit that includes capacitor 74 and wireless power receiving coil 48.

Inverter 60 may include metal-oxide-semiconductor transistors or other suitable transistors that are modulated by AC control signals from control circuitry 16 (FIG. 1) that are received on control signal input 62. The attributes of AC control signal 62 (e.g., duty cycle, frequency, etc.) may be adjusted by control circuitry 16 dynamically during power transmission to control the amount of power being transmitted by power transmitting coils 42.

When transmitting wireless power, control circuitry 16 (FIG. 1) selects one or more appropriate coils 42 to use in transmitting signals 44 to coil 48 (e.g., control circuitry 16 supplies control signals to input 62 of inverter 60 that is to drive the selected coils 42 to produce signals 44). When device 24 is placed on the surface of device 12, the selected coils 42 in device 12 that are driven to produce signals 44 tend to be coils 42 that at least partially overlap with coil 48 in device 24 (when viewing the charging surface of device 12 from above) and are sometimes referred to as "active" wireless transmitting coils. Coils 42 in device 12 that are non-overlapping with coil 48 in device 24 (when viewing the charging surface of device 12 from above) may be unselected and undriven by inverter 60 and are sometimes referred to as "inactive" or temporarily idle coils. Coil 48 and capacitor 74 form a resonant circuit in circuitry 54 that receives signals 44. Receiver 50 rectifies the received signals and provides direct-current output power at output 68.

In a multicoil configuration such as one shown in the example of FIG. 2, the magnetic cross-coupling and leakage between active and inactive coils 42 across the charging surface of power transmitting device 12 can be unacceptably high. Moreover, the magnetic cross-coupling and leakage between coil 48 of device 24 and inactive coils 42 of device 12 can further exacerbate the issue. This results in generation of high harmonic distortion, which causes increased levels of spurious radiated emissions and makes it challenging for power transmitting device 12 to meet worldwide regulatory requirements.

Figure 4:
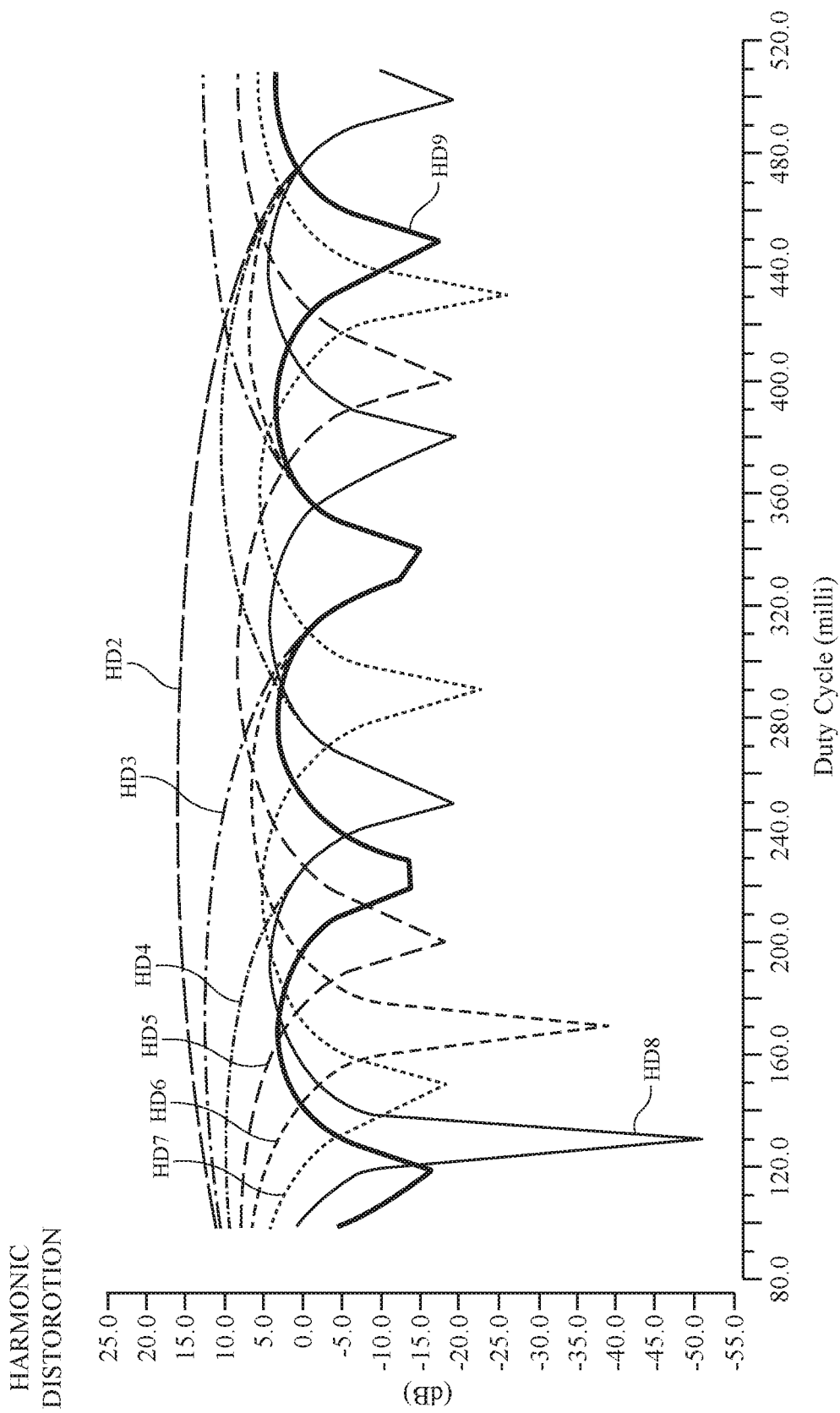
FIG. 4 is a diagram showing harmonic distortion levels at the wireless power transmitting circuitry as a function of duty cycle.

Conventionally, the inverter in the power transmitting circuitry is controlled by a rectangular clock signal. While proper grounding can help reduce the magnetic flux coupling between adjacent coils 42 in power transmitting device 12, the harmonic distortion exists due to the use of the rectangular clock signal controlling the inverter. The rectangular clock signal may have a duty cycle. FIG. 4 is a diagram showing harmonic distortion levels at the wireless power transmitting circuitry as a function of the duty cycle of the rectangular clock signal.

As shown in FIG. 4, the second harmonic distortion HD2 exhibits a trough at about 50% duty cycle; the third harmonic distortion HD3 exhibits a trough at about 34% duty cycle; the fourth harmonic distortion HD4 exhibits a trough at about 25% duty cycle; and so on. In other words, the harmonic distortion profile can vary significantly with duty cycle, which results in radiated spurious emissions (RSEs) across different receivers. According to FIG. 4, since the eighth harmonic distortion HD8 has a trough at around 13% duty cycle, it would be optimal to fix the duty cycle of the rectangular clock signal to 13% in order to minimize HD8. While fixing the duty cycle of the rectangular clock signal to 13% would help minimize HD8, emissions are other harmonic frequencies (e.g., HD2-HD7, HD9, HD10, etc.) would still be significant.

Figure 5:
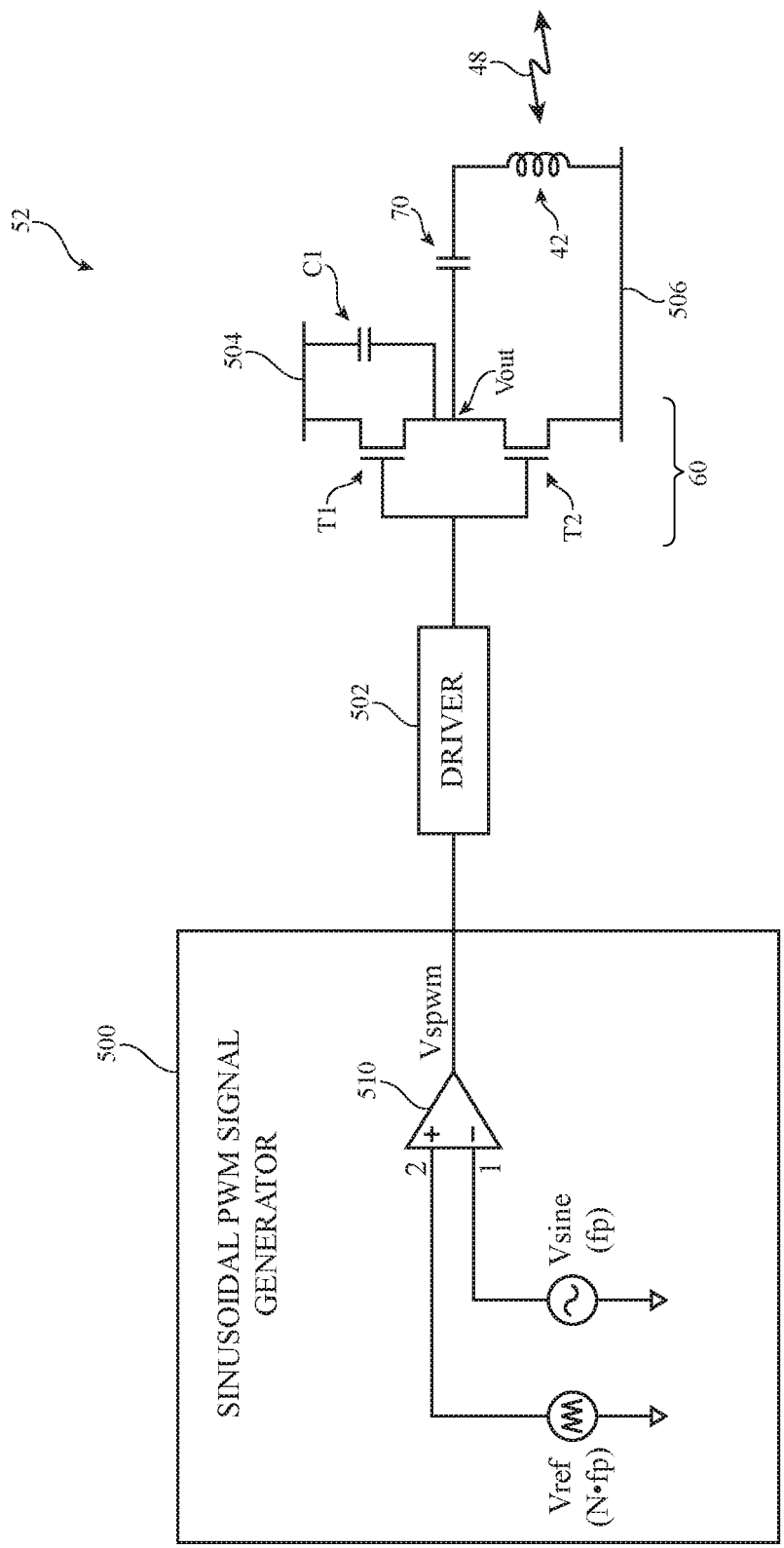
FIG. 5 is a circuit diagram of illustrative wireless power transmitting circuitry that includes a sinusoidal pulse-width modulation input generator, an inverting circuit, and a wireless power transmitting coil in accordance with an embodiment.

In accordance with an embodiment, wireless power transmitting circuitry 52 may be controlled using a signal having different pulse widths to help reduce the harmonic content from that signal. FIG. 5 is a circuit diagram of illustrative wireless power transmitting circuitry 52 that is controlled by a periodic signal exhibit a plurality of different pulse widths. As shown in FIG. 5, power transmitting circuitry 52 includes an inverter 60 configured to drive a corresponding wireless power transmitter resonant circuit that includes coil 42 and capacitor 70.

Inverter 60 may include a first switch (e.g., a first transistor T1) and a second switch (e.g., a second transistor T2) coupled in series between a first power supply line (e.g., a positive power supply terminal 504) and a second power supply line (e.g., a ground power supply terminal 506). Inverter 60 may be modulated to create an AC output waveform signal suitable for driving drive coil 42 for wireless power transfer. In some examples, this signal has a frequency in the kilo-Hertz range, such as between 100 to 400 kHz, including frequencies particularly in the 125 to 130 kHz range. In some examples, this signal is in the mega-Hertz range, such as about 6.78 MHz or more generally between 1 to 100 MHz. In some examples, this signal is in the giga-Hertz range, such as about 60 GHz and more generally between 1 to 100 GHz. As this AC signal passes through coil 42, a corresponding wireless power signal (electromagnetic signal 48) is created and conveyed to coil 48 of circuitry 54. This AC frequency at which power transmitting circuitry 52 is modulated is sometimes referred to as the power frequency ("fp").

Transistors T1 and T2 have gate terminals connected to each other and serve as the input of inverter 60. To generate the AC output waveform at the desired power frequency, inverter 60 may receive at its input a periodic control signal from an input source generator such as sinusoidal pulse-width modulation (PWM) signal generator 500. Signal generator 500 may sometimes be considered as part of control circuitry 16 (see FIG. 1). A buffer circuit such as driver circuit 502 may optionally be interposed between sinusoidal PWM signal generator 500 and the input of inverter 60 to help drive the input of inverter 60 to the desired voltage level.

Sinusoidal PWM signal generator may be configured to generate a periodic control signal having multiple different pulse widths, where a sum of the different pulse widths in a period of the periodic control signal is equal to a selected duty cycle. In other words, the different pulse widths within a period of the control signal, in sum, substantially equal the selected duty cycle. A control signal of this type can be generated using a sinusoidal input source and is thus sometimes referred to as a sinusoidal PWM control signal Vspwm.

One suitable arrangement for generating control signal Vspwm is shown in FIG. 5. In the example of FIG. 5, generator 500 may include a comparison circuit such as comparator 510 having a first input (i.e., the negative input) configured to receive a first periodic input signal, a second input (i.e., the positive input) configured to receive a second periodic input signal, and an output at which control signal Vspwm is provided. The first periodic input source may be a sinusoidal waveform Vsine oscillating at power frequency fp. The second periodic input source may be a reference signal Vref oscillating at a much higher frequency N*fp, where N may at least 10, at least 20, at least 50, at least 100, between 2-10, or some other suitable integer. In certain embodiments, signal Vref may be a triangle wave, a sawtooth wave, a sine wave, or other suitable waveform.

Figure 6A:
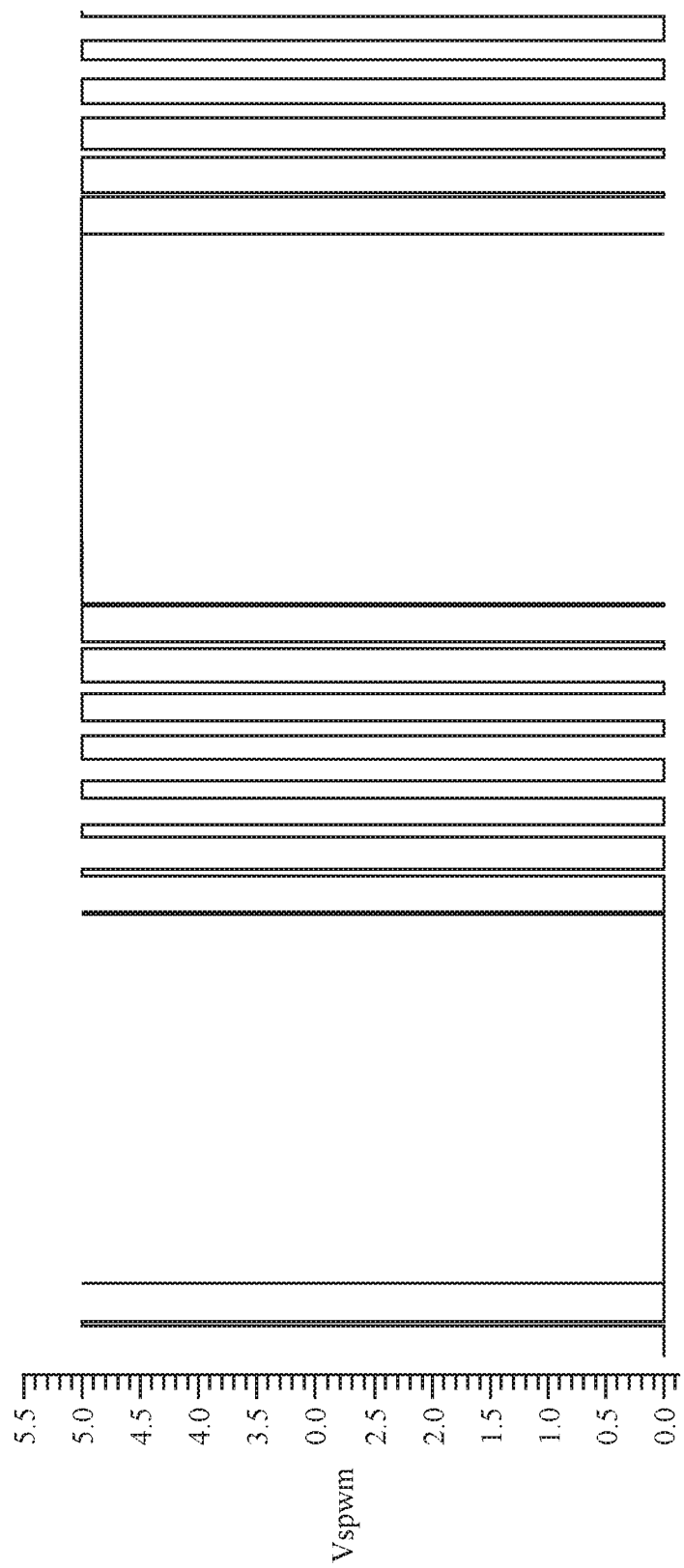
FIG. 6A is a diagram illustrating a sinusoidal pulse-width modulation (SPWM) control signal that can be used to control the wireless power transmitting circuitry in accordance with an embodiment.

FIG. 6A is a diagram illustrating a sinusoidal pulse-width modulation (SPWM) control signal Vspwm that is provided at the output of comparator 510 and that can be used to control wireless power transmitting circuitry 52. As shown in FIG. 6A, signal Vspwm exhibits a plurality of different pulse widths. The sum of the different pulse widths in signal Vspwm may equal to a selected duty cycle. For example, in the scenario in which the selected duty cycle is 30%, the duration of time when signal Vspwm is high (i.e., the sum of all the high pulses) will be approximately 30% of a period of signal Vsine. As another example, in the scenario in which the selected duty cycle is 50%, the sum of all the different pulse widths in Vspwm will be equal to substantially half of the period of signal Vsine.

Figure 6B:
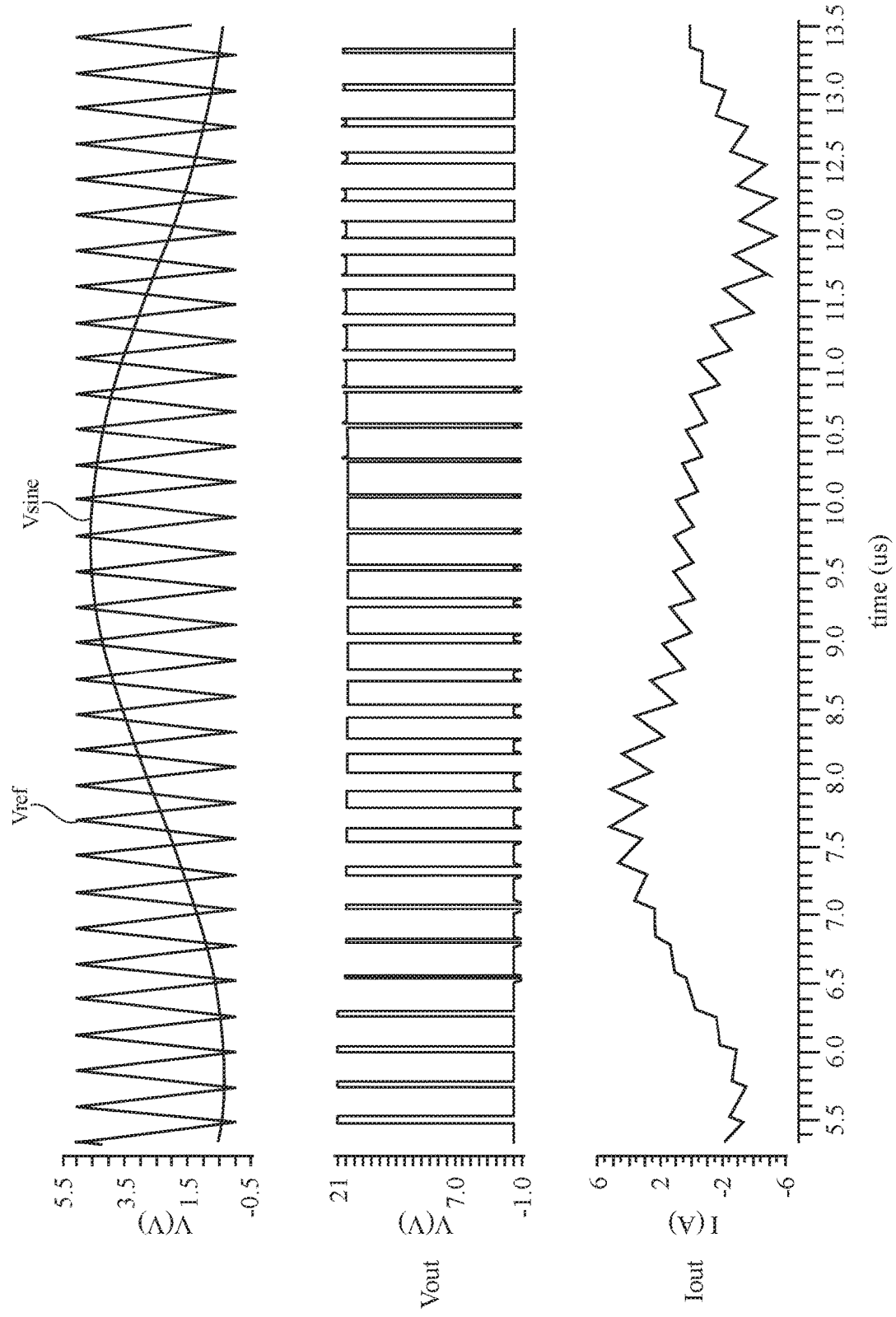
FIG. 6B is a diagram illustrating SPWM output waveforms generated by the wireless power transmitting circuitry in accordance with an embodiment.

FIG. 6B is a diagram illustrating waveforms that can be generated by wireless power transmitting circuitry 52 (e.g., by feeding in signals Vsine and Vref to the input of comparator 510). Sinusoidal signal Vsine has a frequency fp, and FIG. 6B shows one period of frequency fp. In the example of FIG. 6B, signal Vref is a triangle waveform having a frequency of about 30*fp. These signals are fed into comparator 510 (FIG. 5) to generate corresponding signal Vspwm as shown in FIG. 6A. Signal Vspwm, which can be optionally amplified or level-shifted using driver 502, is received at the input of inverter 60. In response to receiving the SPWM control signal, inverter 60 may generate at its output voltage waveform Vout and current waveform Iout. Still referring to FIG. 6B, waveform Vout exhibits a similar shape as Vspwm (e.g., Vout also has a plurality of different pulse widths summing to the target duty cycle).

Figure 6C:
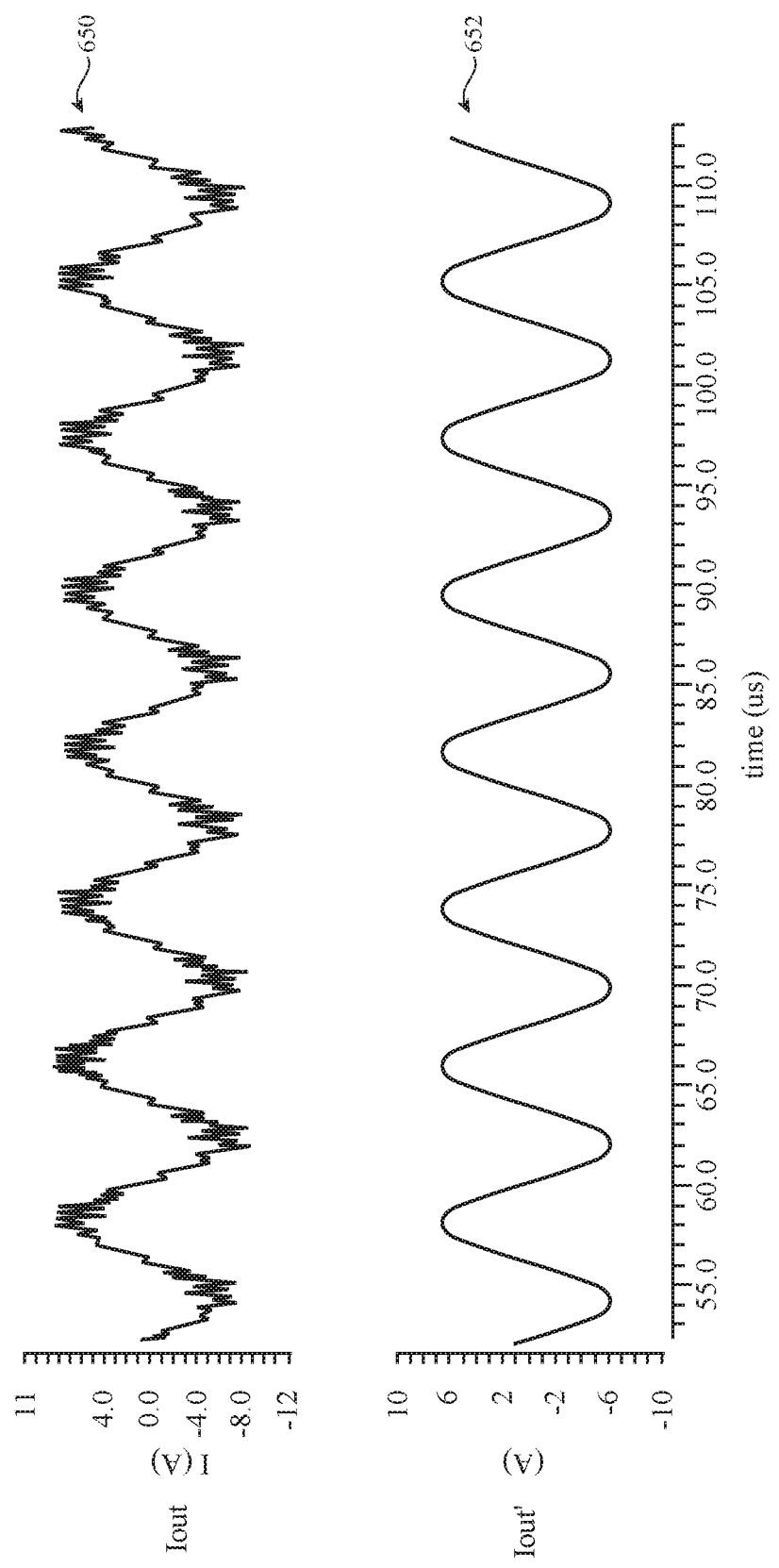
FIG. 6C is a diagram showing how the high frequency component in the SPWM current output waveform can be suppressed in accordance with an embodiment.

Radiated spurious emissions is generally dominated by output current Iout. In the example of FIG. 6B, the different pulses in Vout can cause corresponding high-frequency spikes in the Iout waveform. FIG. 6C shows a more zoomed-out version of Iout (see, e.g., waveform 650). In accordance with certain embodiments, the high-frequency components in the output current can be filtered out using a capacitor such as capacitor C1 coupled in parallel with transistor T1 (see, e.g., FIG. 5). Configured in this way, capacitor C1 will filter out any undesired high-frequency components associated with Vref (such as undesired high-frequency components at N*fp, 2N*fp, 3N*fp, 4N*fp, 5N*fp, etc.), thereby achieve low radiated spurious emissions. A resulting output current Iout' with high-frequency components filtered out is shown as waveform 652 in FIG. 6C, which does not include the unwanted spikes.

The exemplary configuration of FIG. 5 in which sinusoidal PWM signal generator 500 is implemented using a comparator that receives two different periodic input signals to generate a sinusoidal PWM control signal is merely illustrative and is not intended to limit the scope of the present embodiments. If desired, PWM signal generator 500 may be implemented in other suitable ways to generate a control signal with a plurality of different pulse widths summing to the desired duty cycle.

The improvement provided by use of a sinusoidal PWM control signal is illustrated in FIGS. 7-10. FIG. 7A is a diagram of a rectangular wave Vsq having a fixed 25% duty cycle. If this signal Vsq were fed to the input of inverter 60 via driver 502, the corresponding frequency response at the output of inverter 60 is shown in FIG. 7B. The power level at power frequency fp is labeled as fundamental frequency component F0; the second harmonic distortion component is labeled as HD2; the third harmonic distortion component is labeled as HD3; the fourth harmonic distortion component is labeled as HD4; and so on. In the example of FIG. 7B, the harmonic distortion components are undesirably high relative to F0. The fourth harmonic distortion HD4 and the eight harmonic distortion are comparatively low when the duty cycle is at 25%, which is consistent with the diagram of FIG. 4 where HD4 and HD8 both exhibit a local trough at 25% duty cycle.

Figure 8A:
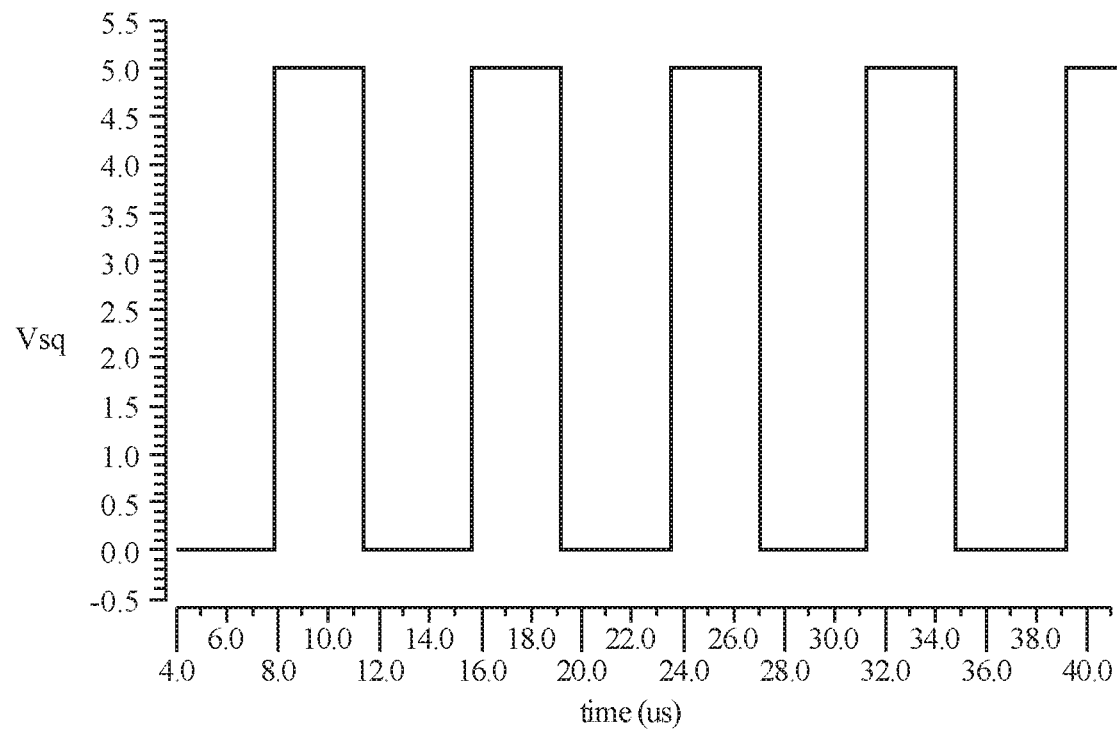
FIG. 8A is a diagram of a rectangular wave having fixed 45% duty cycle.
Figure 8B:
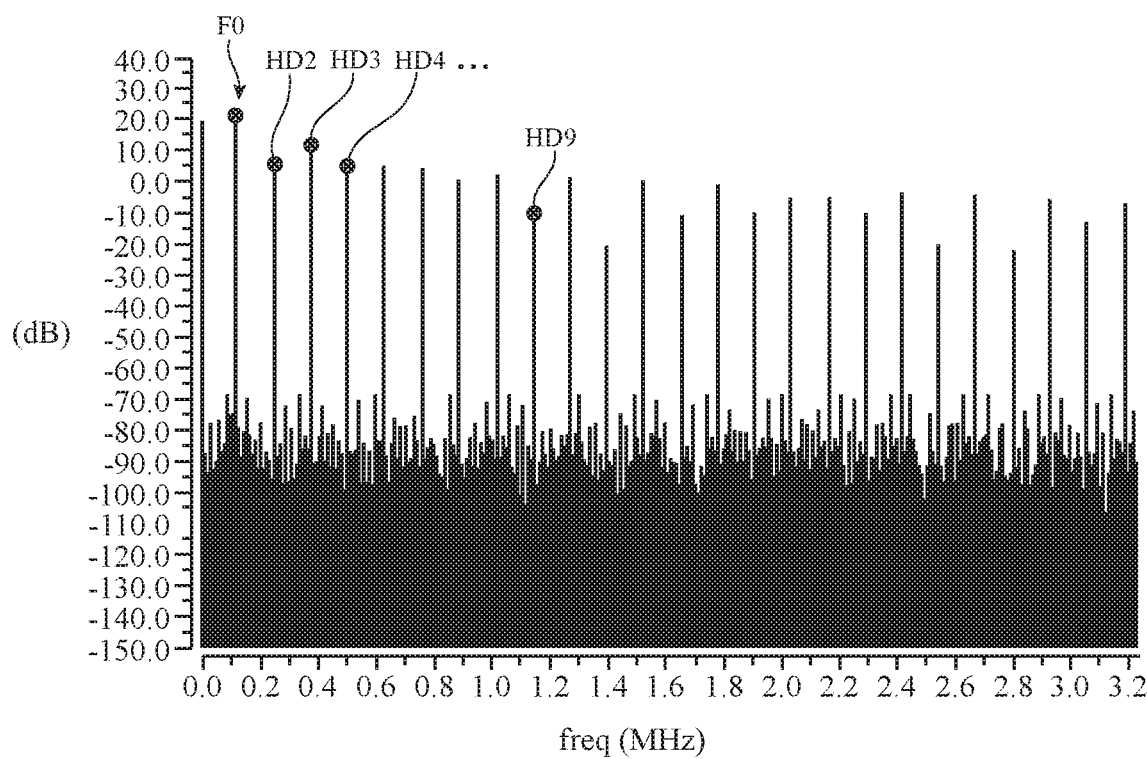
FIG. 8B is a diagram showing harmonic distortion levels at wireless power transmitting circuitry controlled using the rectangular wave of FIG. 8A.

FIG. 8A is a diagram of a rectangular wave Vsq having a fixed 45% duty cycle. If this signal Vsq were fed to the input of inverter 60 via driver 502, the corresponding frequency response at the output of inverter 60 is shown in FIG. 8B. In the example of FIG. 8B, the harmonic distortion components are also undesirably high relative to F0. The ninth harmonic distortion HD9 is comparatively low when the duty cycle is at 45%, which is consistent with the diagram of FIG. 4 where HD9 exhibits a local trough at around 45% duty cycle.

Figure 9A:
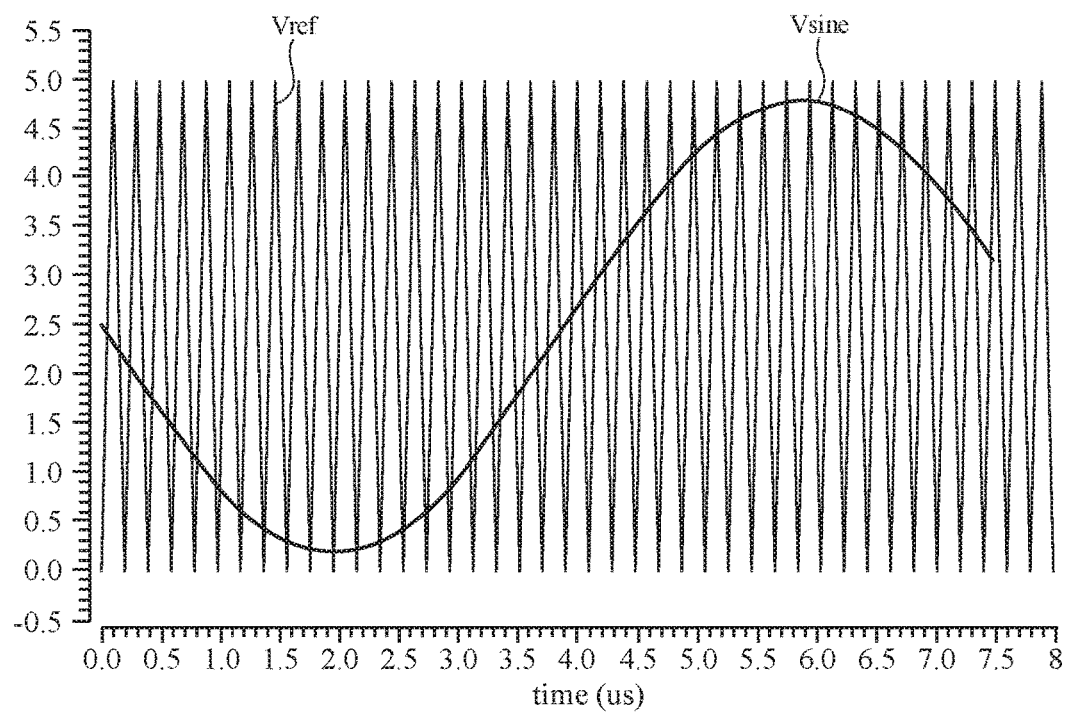
FIG. 9A is a diagram showing input signals for the comparator of FIG. 5 in accordance with an embodiment.

FIG. 9A is a diagram showing input signals for comparator 510 of FIG. 5. Signal Vsine oscillates at frequency fp, whereas Vref toggles at a much higher frequency N*fp (where N is approximately equal to 40 in the example of FIG. 9A). When these signals are fed into the inputs of comparator 510, a corresponding control signal Vspwm with a plurality of different pulse widths summing to an effective duty cycle of 25% can be produced (see, e.g., FIG. 6A). Inverter 60 receiving such control signal Vspwm may exhibit a corresponding frequency response of FIG. 9B at the output of inverter (see, e.g., Vout in FIG. 6B). The power level at power frequency fp is labeled as fundamental frequency component F0; the second harmonic distortion component is labeled as HD2; the third harmonic distortion component is labeled as HD3; the fourth harmonic distortion component is labeled as HD4; and so on.

Figure 7A:
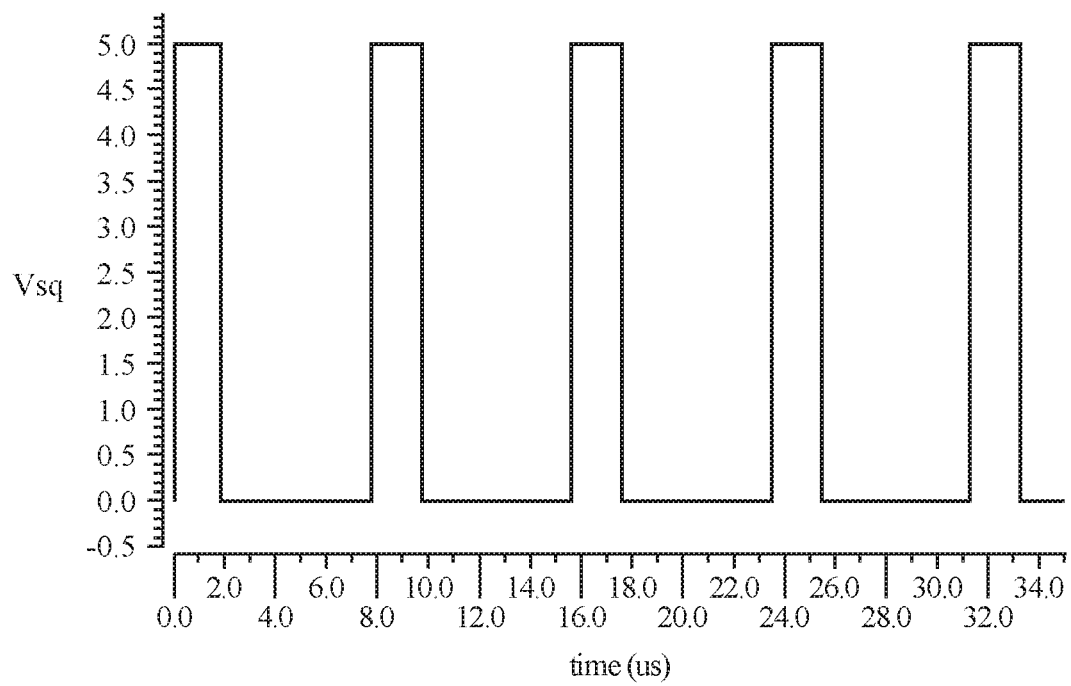
FIG. 7A is a diagram of a rectangular wave having fixed 25% duty cycle.
Figure 7B:
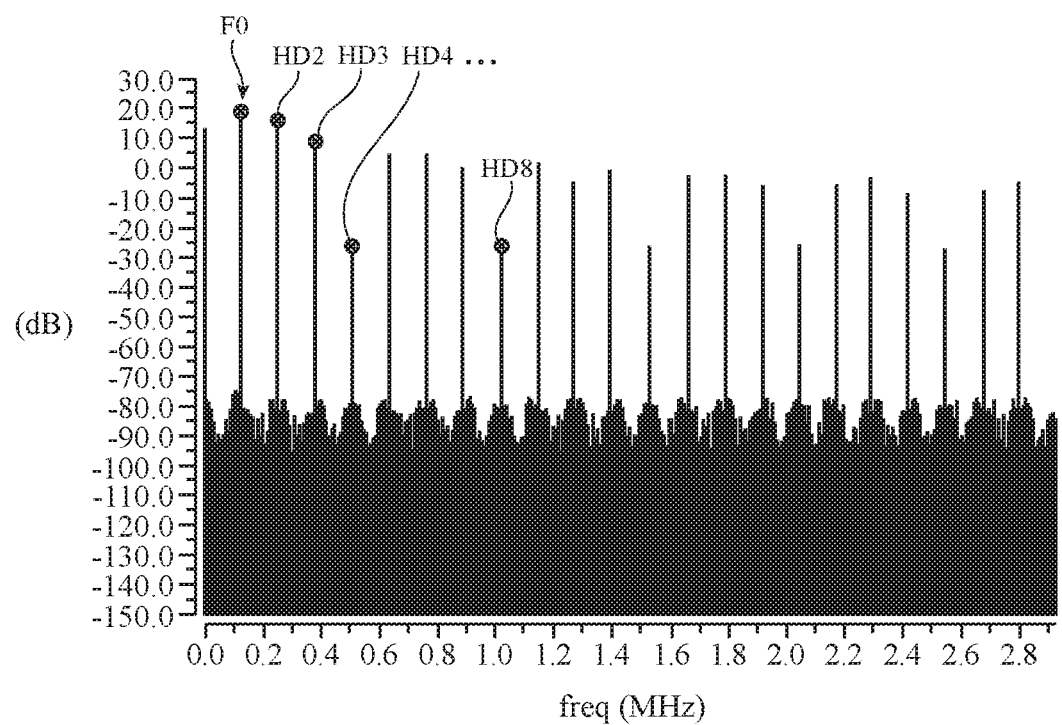
FIG. 7B is a diagram showing harmonic distortion levels at wireless power transmitting circuitry controlled using the rectangular wave of FIG. 7A.
Figure 9B:
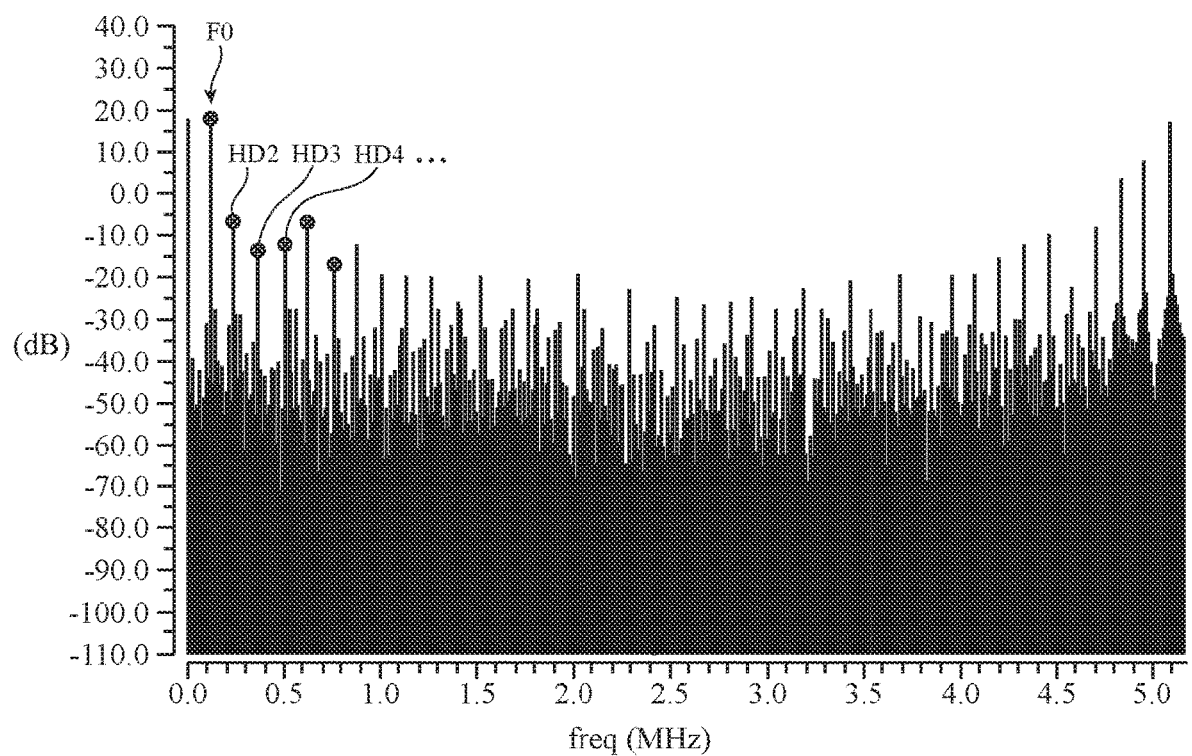
FIG. 9B is a diagram showing harmonic distortion levels at the wireless power transmitting circuitry controlled using the input signals of FIG. 9A.

In the example of FIG. 9B, the harmonic distortion components (i.e., HD2, HD3, HD4, HD5, etc.) are all much lower than that of FIG. 7B, both yielding a 25% duty cycle. For example, HD2 in FIG. 7B is around 16 dB, whereas HD2 in FIG. 9B is around −7 dB. In other words, using a sinusoidal PWM control signal instead of a conventional rectangular clock signal can yield around a 23 dB improvement in HD2. The reduction of harmonic distortion at the various higher order frequencies is due to the different pulse widths in Vspwm, each of which helps to contribute a destructive trough for each of the harmonic frequencies. The use of a sinusoidal PWM control signal therefore mitigates harmonic content from the source (i.e., at the input of inverter 60). As a result, any re-radiation among the coils 42 will have little impact on far-field radiated spurious emissions and can help power transmitting device 12 better meet worldwide regulatory requirements.

Figure 10A:
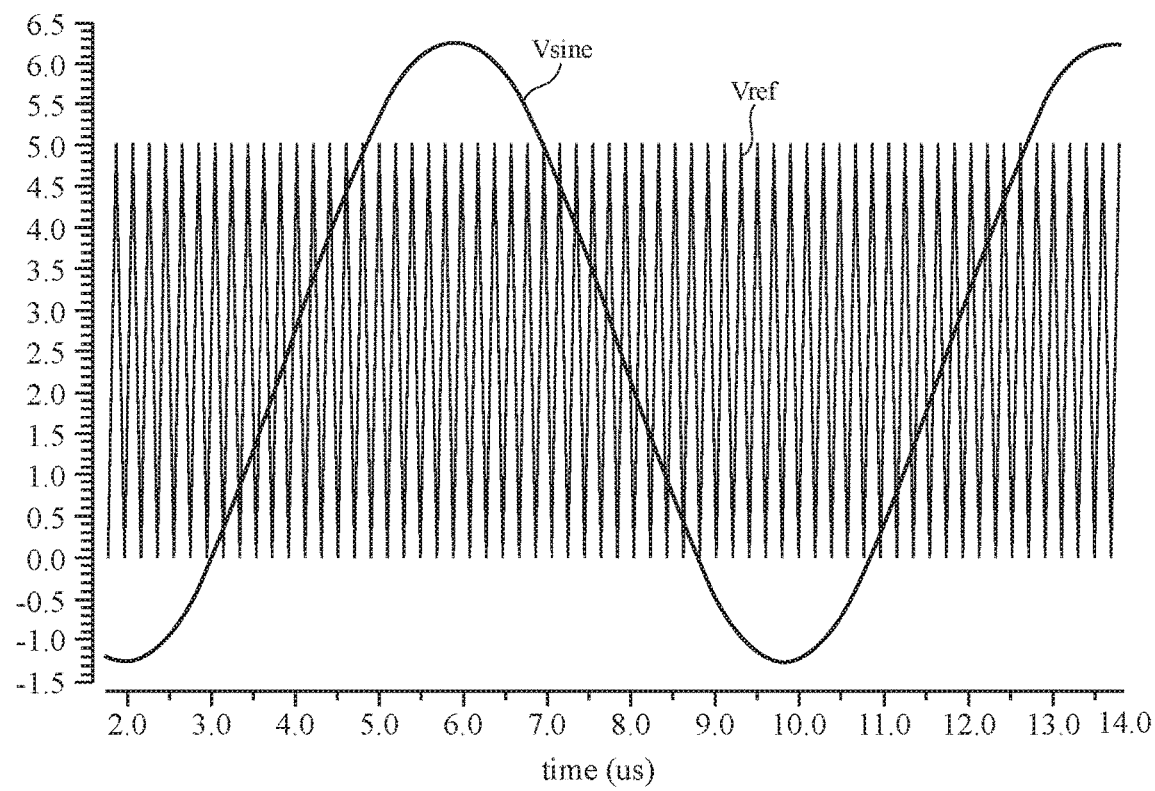
FIG. 10A is a diagram showing input signals for the comparator of FIG. 5 in accordance with an embodiment.

As described above, the input signals of FIG. 9A are used to provide an effective duty cycle of 25%. To change the effective duty cycle in the sinusoidal PWM scheme, the amplitude of input source Vsine can be adjusted. FIG. 10A is a diagram showing input signals for comparator 510 of FIG. 5 that produces an effective duty cycle of 45% (e.g., by increasing the amplitude of Vsine). Signal Vsine oscillates at frequency fp, whereas Vref toggles at a much higher frequency N*fp (where N is approximately equal to 40 in the example of FIG. 10A). When these signals are fed into the inputs of comparator 510, a corresponding control signal Vspwm with a plurality of different pulse widths summing to an effective duty cycle of 45% can be produced. Inverter 60 receiving such control signal Vspwm may exhibit a corresponding frequency response of FIG. 10B at the output of inverter.

Figure 10B:
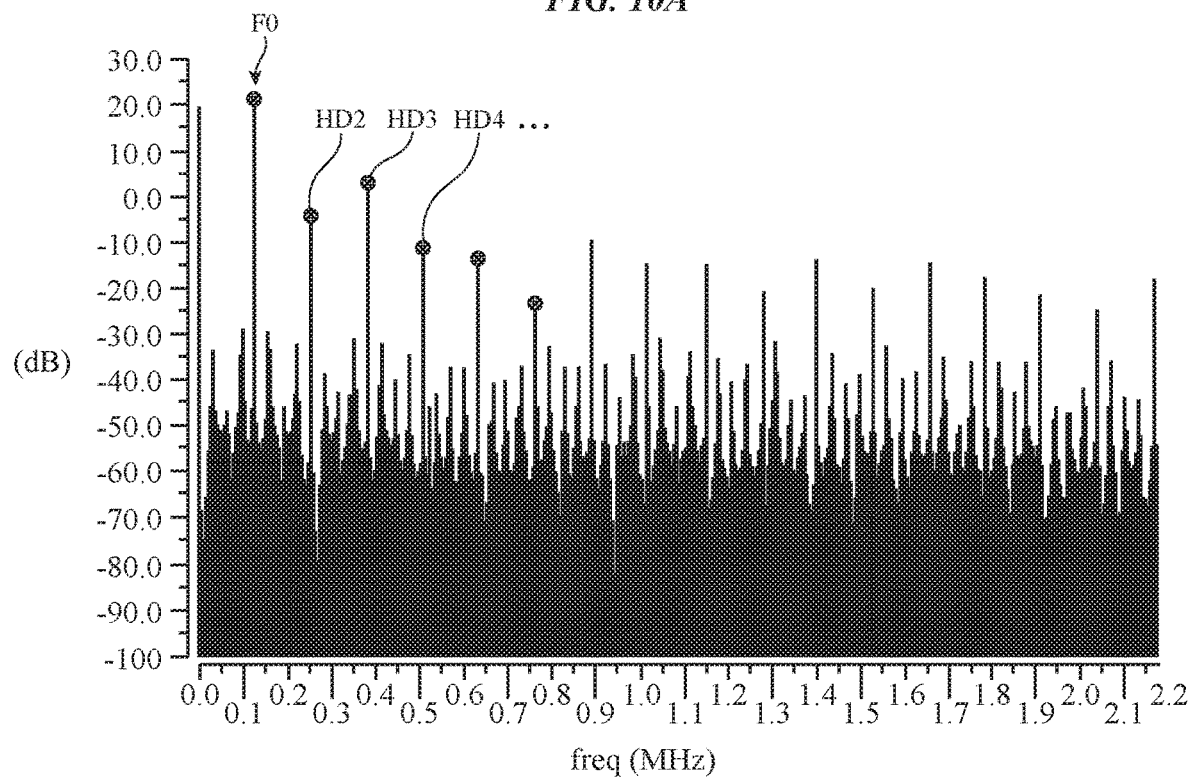
FIG. 10B is a diagram showing harmonic distortion levels at the wireless power transmitting circuitry controlled using the input signals of FIG. 10A.

In the example of FIG. 10B, the harmonic distortion components (i.e., HD2, HD3, HD4, HD5, etc.) are all much lower than that of FIG. 8B, both at 45% duty cycle. For example, HD2 in FIG. 8B is around 5.5 dB, whereas HD2 in FIG. 10B is around −4.5 dB. In other words, using a sinusoidal PWM control signal instead of a conventional rectangular clock signal can yield around a 10 dB improvement in HD2. The reduction of harmonic distortion at the various higher order frequencies is due to the different pulse widths in Vspwm, each of which helps to contribute a destructive trough for each of the harmonic frequencies. The use of a sinusoidal PWM control signal therefore mitigates harmonic content from the source (i.e., at the input of inverter 60). As a result, any re-radiation among the coils 42 will have little impact on far-field radiated spurious emissions and can help power transmitting device 12 better meet worldwide regulatory requirements.

Figure 11:
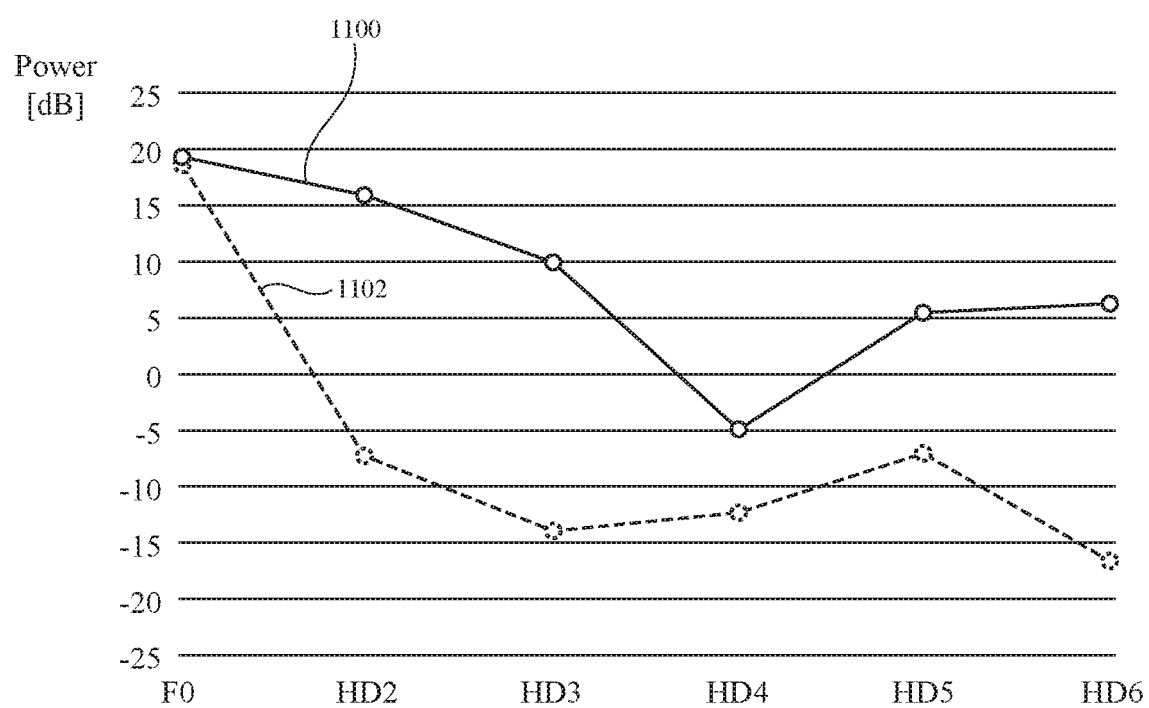
FIG. 11 is a diagram illustrating how controlling the wireless power transmitting circuitry using sinusoidal pulse width modulation reduces harmonic distortion in accordance with an embodiment.

FIG. 11 is a diagram illustrating how controlling the wireless power transmitting circuitry using sinusoidal pulse width modulation reduces harmonic distortion. Line 1100 represents the power levels at fundamental frequency F0 and harmonic frequencies HD2-HD6 when inverter 60 is controlled by a rectangular clock signal with only one fixed pulse width. Line 1102 represents the power levels at fundamental frequency F0 and harmonic frequencies HD2-HD6 when inverter 60 is controlled by a sinusoidal PWM control signal with a many different pulse widths. As shown in the example of FIG. 11, the harmonic distortion levels are substantially reduced for line 1102 relative to line 1100, where HD2 is reduced by more than 20 dB, HD3 is reduced by more than 20 dB, HD4 is reduced by more than 5 dB, HD5 is reduced by more than 10 dB, HD6 is reduced by more than 20 dB, etc. Reducing harmonic content in this way can dramatically decrease radiated spurious emissions at the wireless power transmitting device.

The foregoing is merely illustrative and various modifications can be made to the described embodiments. The foregoing embodiments may be implemented individually or in any combination.

What is claimed is:

1. A wireless power transmitting device configured to transmit wireless power signals to a wireless power receiving device, the wireless power transmitting device comprising:
a wireless power transmitting coil;
an inverting circuit configured to drive the wireless power transmitting coil at a selected duty cycle; and
a pulse-width modulation signal generator configured to output a periodic control signal having a plurality of different pulse widths, wherein a sum of the plurality of different pulse widths in a period of the control signal is equal to the selected duty cycle, and wherein the inverting circuit is configured to receive the control signal from the pulse-width modulation input generator to reduce harmonic distortion at the wireless power transmitting device.

2. The wireless power transmitting device of claim 1, wherein the pulse-width modulation signal generator comprises a comparator having an output terminal at which the control signal is generated.

3. The wireless power transmitting device of claim 2, wherein the comparator further comprises:
a first input configured to receive a first periodic signal; and
a second input configured to receive a second periodic signal.

4. The wireless power transmitting device of claim 3, wherein the first periodic signal has a first frequency, and wherein the second periodic signal has a second frequency that is different than the first frequency.

5. The wireless power transmitting device of claim 4, wherein the second frequency is at least ten times the first frequency.

6. The wireless power transmitting device of claim 5, wherein the first periodic signal is a sine wave.

7. The wireless power transmitting device of claim 5, wherein the second periodic signal is a triangle wave.

8. The wireless power transmitting device of claim 5, wherein the second periodic signal is a sawtooth wave.

9. The wireless power transmitting device of claim 5, wherein the inverting circuit comprises:
a first switch;
a second switch coupled in series with the first switch; and
a capacitor coupled in parallel with the first switch, wherein the capacitor is configured to filter out high-frequency components associated with the second periodic signal.

10. The wireless power transmitting device of claim 1, further comprising:
a driver circuit interposed between the pulse-width modulation signal generator and the inverting circuit.

11. A method of operating a wireless power transmitting device configured to transmit wireless power signals to a wireless power receiving device, the method comprising:
with an inverting circuit, driving a wireless power transmitting coil at a given duty cycle;
with a pulse-width modulation signal generator, generating a periodic control signal having a plurality of different pulse widths, wherein a sum of the plurality of different pulse widths in a period of the control signal is substantially equal to the given duty cycle; and
receiving the control signal at an input of the inverting circuit to reduce harmonic distortion at the wireless power transmitting device.

12. The method of claim 11, further comprising:
with the inverting circuit, driving a resonant circuit.

13. The method of claim 11, wherein the pulse-width modulation signal generator includes a comparator, the method further comprising:
receiving a first periodic waveform at a first input of the comparator; and
receiving a second periodic waveform at a second input of the comparator.

14. The method of claim 13, wherein the first periodic waveform has a first frequency, and wherein the second periodic waveform has a second frequency that is at least 10 times the first frequency.

15. The method of claim 14, wherein the first periodic waveform is a sine wave, and wherein the second periodic waveform is a selected one of: a triangle wave and a sawtooth wave.

16. A wireless power transmitting device, comprising:
a resonant circuit;
an inverter configured to drive the resonant circuit, wherein the inverter is configured to receive a pulse-width modulation control signal; and
a pulse-width modulation signal generator configured to output the pulse-width modulation control signal, wherein the pulse-width modulation control signal has a given frequency and includes a plurality of different pulse widths in a period of the given frequency.

17. The wireless power transmitting device of claim 16, wherein the resonant circuit comprises:
a wireless power transmitting coil; and
a capacitor coupled in series with the wireless power transmitting coil.

18. The wireless power transmitting device of claim 16, wherein the inverter comprises:
   a first transistor;
   a second transistor coupled in series with the first transistor; and
   a capacitor coupled in parallel with the first transistor.

19. The wireless power transmitting device of claim 16, wherein the pulse-width modulation signal generator comprises:
   a comparison circuit configured to receive a first periodic signal of a first frequency and a second periodic signal of a second frequency that is greater than the first frequency.

20. The wireless power transmitting device of claim 19, wherein the first periodic signal is a sinusoidal signal, and wherein the second periodic signal is a triangular signal.

* * * * *